Nov. 26, 1957   G. L. BOWMAN   2,814,357
VACUUM CLEANER AND AIR FILTER THEREFOR
Filed Feb. 8, 1955
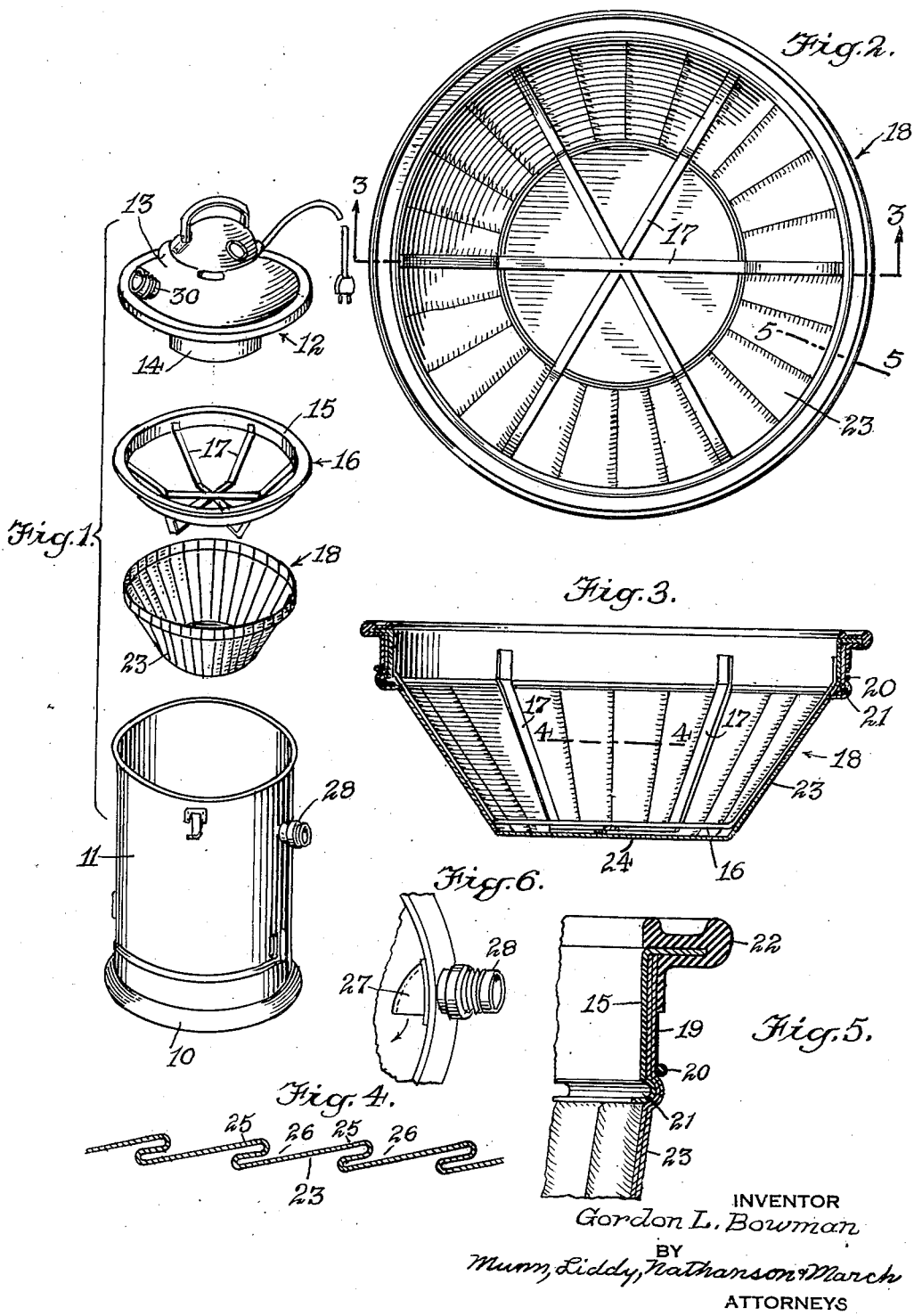
INVENTOR
Gordon L. Bowman
BY
Munn, Liddy, Nathanson & March
ATTORNEYS

United States Patent Office 2,814,357
Patented Nov. 26, 1957

2,814,357
VACUUM CLEANER AND AIR FILTER THEREFOR

Gordon L. Bowman, Edina, Minn., assignor to Premier Company, St. Paul, Minn., a corporation of Minnesota Application February 8, 1955, Serial No. 486,848

1 Claim. (Cl. 183—37)

This invention relates to vacuum cleaners, and more particularly to the combination of a vacuum cleaner and an air filtering means therefor.

The invention is embodied in an industrial-type vacuum cleaner. However, it should be understood that this is for illustrative purposes only and is not to be taken in a restrictive sense, since the scope of the invention is more properly defined by the appended claims.

An object of the invention is to provide an improved vacuum cleaner and novel, air-pervious filtering element in conjunction with air swirling means, whereby a relatively large filter surface is available and effectively strains all of the air, in spite of relatively small, overall size of the element.

Another object of the invention is to provide an improved vacuum cleaner and filter as above set forth, wherein the filter element is folded or pleated to greatly extend its effective area while at the same time being uniformly and fully exposed to the dust-carrying air and not interfering with the normal air flow.

Yet another object of the invention is to provide a novel and improved, air-filter unit for a vacuum cleaner, which unit has a large capacity for its size and is so constituted that additional filter surfaces are available for use as the filter becomes partly loaded with dust.

A further object of the invention is to provide a novel and improved vacuum cleaner and air filter in accordance with the above, which is extremely effective and efficient in use, durable, and simple and economical to fabricate.

Other features and advantages will hereinafter appear.

In the accompanying drawings:

Fig. 1 is a perspective, exploded view of a vacuum cleaner and air filter made in accordance with the invention;

Fig. 2 is a top or plan view of the filter element of the vacuum cleaner of Fig. 1;

Fig. 3 is a diametric section of the filter element of Fig. 2, taken on line 3—3 thereof;

Fig. 4 is a fragmentary sectional view taken on line 4—4 of Fig. 3;

Fig. 5 is a fragmentary sectional view taken on line 5—5 of Fig. 2; and

Fig. 6 is a fragmentary top or plan view of the dirt can of the vacuum cleaner, showing the air inlet and means for swirling the air.

Referring to Fig. 1, the improved vacuum cleaner of the present invention comprises a circular base 10 carrying a cylindrical dirt can 11 arranged with its axis upright. Adapted to be accommodated and carried by the top of the dirt can 11 is a head assembly 12 having a bowl-shaped, inverted head casing 13 and an electric motor and air impelling unit 14 disposed within and below the casing.

Adapted to be carried by the upper rim of the dirt can 11 and to be interposed between said rim and the head casing 13 is an annular rim 15 of a spider or cage 16, said cage having angular diametric spokes or ribs 17.

In accordance with the present invention I provide a novel and improved, highly efficient and effective filter element 18, arranged to be carried by the cage 16 for filtering the air sucked by the motor unit 14. The filter element 18, Figs. 2–5, comprises an annular rim portion 19, extending around the rim 15 of the cage 16 and secured thereto by a wire band 20. The rim 15 has an annular bead or curl 21 extending along its lower edge, said bead being cooperable with the wire 20 to retain the filter element in place. An annular rubber or resilient sealing washer 22 is provided, secured to the rim 15 of the cage 16 and engageable with the upper rim of the dirt can 11 to provide an air-tight seal therewith. Preferably the filtering element 18 is bowl-shaped, having frusto-conical side walls 23 and a circular bottom wall 24. The side walls 23 and bottom wall 24 of the filter element 18 extend closely adjacent the exterior and lower sides of the annular ribs 17 of the cage or spider 15.

As seen in Figs. 2, 3 and 4, I provide folds or pleats 25 in the frusto-conical side walls 23 of the filter element 18, said folds forming pockets 26 so arranged that they face in clockwise directions as viewed from the top of the element. In conjunction with the pleated side walls of the filter element 18 I provide means in the dirt can 11, comprising an air-deflecting hood 27, directly inside of the air inlet fitting 28 of the can, Fig. 6, to impart a clockwise, swirling movement to the dust-laden air sucked into the can.

By the provision of the air-deflecting hood 27 the air will pass over the folds 25 of the filter element 18 from left to right as viewed in Fig. 4, and this air will therefore not be caught or pocketed in the pockets 26 of the element because of its swirling movement, and this is an important feature of the present invention. The existence of the pockets 26 will therefore not appreciably impede the swirling movement of the dust laden air, but instead said air may freely travel along the walls of the can 11 and be sucked through all portions of the filter.

Operation of the improved vacuum cleaner and filtering means is as follows: Since the filter element 18 is air pervious, suction created by the motor-impeller unit 14 within the element will cause air to be sucked inward through all of the pleated walls 23 and also through the circular bottom wall 24. This action will cause air to be sucked in through the suction fitting 28 of the can, and such air will be deflected by the hood 27 and caused to swirl and to move in a clockwise direction past the side walls 23 of the filter element 18 and eventually to pass through the filter element and be discharged from an outlet fitting 30, Fig. 1, in the head assembly of the cleaner.

By the provision of the folded or pleated side walls 23 I am able to obtain a much greater filtering surface in the filter element 18 than otherwise; in other words, the element has a very large effective or filtering area for its size. As the vacuum cleaner is put in use, dust will collect in the pockets 26 of the filter, and said pockets will gradually be forced open more and more, revealing new filter surfaces for the inward passage of the air. Thus a progressive straining action occurs in effect, whereby the filter element will have a long or extended useful cycle before requiring cleaning, or replacement.

Variations and modifications may be made within the scope of the claim and portions of the improvements may be used without others.

I claim:

In a vacuum cleaner, a combination of a dust can having an air orifice in a side wall; means for imparting a swirling motion to air in the can in response to passage of air through said orifice, said means comprising a hood disposed within the can and having an opening facing in one circumferential direction; power-driven, air-impelling means connected with the can, for forcing air through said orifice and hood; a dust filter in said can, comprising an air-pervious sheet extending along and spaced from the side walls of the can, said sheet having folds forming pockets, all of which face in the same said circumferential direction; a supporting spider carried by the can and disposed inside said dust filter to prevent collapse thereof; said pockets being adapted to expand in response to the disposition of dust on said sheet, thereby to cause all additional filter surfaces to become exposed.

References Cited in the file of this patent

UNITED STATES PATENTS

| | | |
|---|---|---|
| 2,063,990 | Dym | Dec. 15, 1936 |
| 2,296,359 | Martinet | Sept. 22, 1942 |
| 2,510,440 | Vokes | June 6, 1950 |
| 2,537,992 | Gross et al. | Jan. 16, 1951 |
| 2,564,845 | Holt | Aug. 21, 1951 |

FOREIGN PATENTS

| | | |
|---|---|---|
| 20,176 | Great Britain | Sept. 4, 1912 |
| 446,465 | Great Britain | Apr. 30, 1936 |
| 656,164 | Germany | Jan. 31, 1938 |